J. H. WATSON.
Feed and Gig Works for Saw-Mills.
No. 224,749. Patented Feb. 17, 1880.
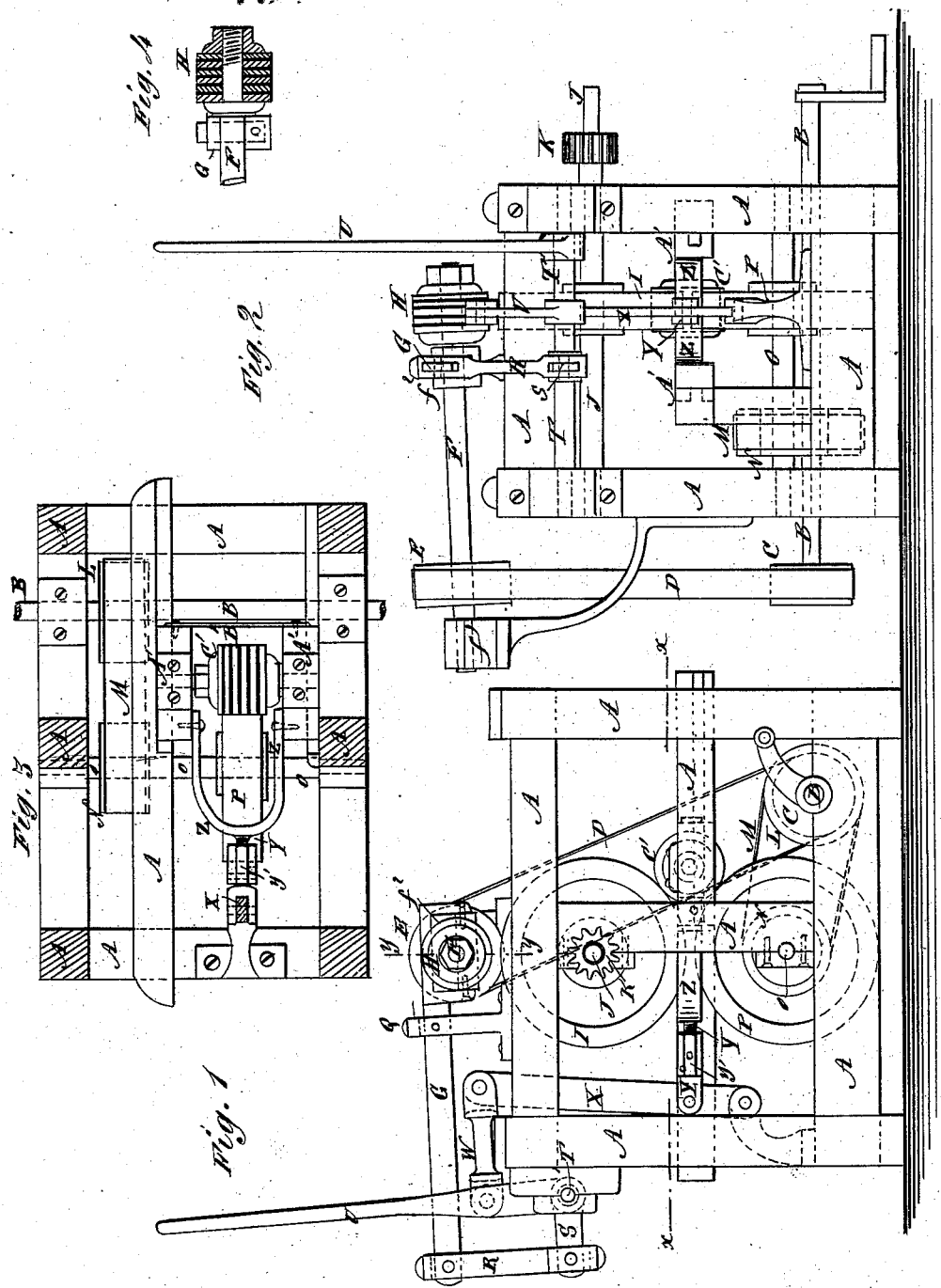
WITNESSES:
C. Neveux
C. Sedgwick
INVENTOR:
J. H. Watson
BY Munn &
ATTORNEYS.

UNITED STATES PATENT OFFICE.

JAMES H. WATSON, OF TAWAS CITY, MICHIGAN.

FEED AND GIG WORKS FOR SAW-MILLS.

SPECIFICATION forming part of Letters Patent No. 224,749, dated February 17, 1880.

Application filed July 2, 1879.

*To all whom it may concern:*

Be it known that I, JAMES HENRY WATSON, of Tawas City, in the county of Iosco and State of Michigan, have invented a new and Improved Feed and Gig Works for Saw-Mills, of which the following is a specification.

Figure 1 is a side view of my improved device. Fig. 2 is a front view of the same. Fig. 3 is a horizontal section of the same, taken through the line *x x*, Fig. 1. Fig. 4 is a detail section of one of the friction-wheels.

The object of this invention is to furnish an improved feed and gig mechanism for the carriage of circular-saw mills which shall be simple in construction and convenient and effective in use, allowing the change of motion to be made quickly and easily.

The invention consists in the combination of the two levers, the two arms, the three connecting-rods, and the U-bar with the sliding bearings of the lower friction-wheel and with the lever that carries the feed friction-shaft and the upper friction-wheel.

A represents the frame of the machine. B represents the driving-shaft, which revolves in bearings attached to the frame A or to other similar supports. To the shaft B is attached a pulley, C, around which passes a belt, D, which also passes around a pulley, E, attached to the feed friction-shaft F.

In practice, the feed friction-shaft F will be driven from the saw-arbor, (which is not shown in the drawings,) and the saw-arbor will be driven from the driving-shaft B.

The shaft F revolves in a bearing, *f'*, attached to the frame A, or to a bracket or arm attached to the same frame, and in a bearing, *f²*, attached to the inner end of the friction-lever G.

To the shaft F is attached a small friction-wheel, H, which, by the movements of the friction-lever G, is thrown into and out of gear with the large friction-wheel I, attached to the feed-shaft J.

The shaft J revolves in bearings attached to the frame A, and to it is attached the small gear-wheel K, by which the carriage is moved forward and back. To the driving-shaft B is attached a pulley, L, around which passes a belt, M. The belt M also passes around a pulley, N, attached to the gig-shaft O, which revolves in bearings attached to the frame A, and to it is attached a large friction-wheel, P, placed directly below and at a little distance from the friction-wheel I.

The friction-lever G is pivoted to a standard, Q, attached to the frame A, and to its outer end is pivoted the upper end of a short connecting-rod, R, the lower end of which is pivoted to the outer end of an arm, S, formed upon or rigidly attached to the rock-shaft T. The rock-shaft T works in bearings attached to the frame A, and to it is rigidly attached, or upon it is formed, the feed-lever U, by means of which it is operated.

To the rock-shaft T is also rigidly attached, or upon it is formed, an arm, V, to the end of which is pivoted the end of a short connecting-rod, W. The other end of the connecting-rod W is pivoted to the upper end of the gig-lever X, the lower end of which is pivoted to a support attached to the frame A.

To the gig-lever X is pivoted the end of a connecting-bar, Y, which is made in two parts connected by a long nut, *y'*, having a right screw-thread cut in one end and a left screw-thread cut in its other end, so that the said rod may be shortened to take up the wear by turning the said nut. The inner end of the connecting-rod Y is attached to the center of a U-bar, Z, the ends of which are attached to two bearings, A'. The bearings A' slide in rabbeted bars of the frame A, and are connected at their rear ends by a cross-bar, B'.

To the bearings A' are pivoted the journals of the small friction-wheel C'. The friction-wheel C' is so placed that when drawn forward it enters the space between the friction-wheels I P, and comes in contact with the faces of both of the said wheels, so that the feed-shaft J will be driven in the opposite direction, and will thus gig the carriage.

The two friction-wheels H C' are so connected that either may be thrown into gear, and the other out of gear, by a single slight movement of the feed-lever U, thus effecting a great saving of time and allowing the machine to do much more work than would otherwise be possible. The friction-wheels H C' are formed of alternate layers of paper and rubber, as shown in Figs. 2, 3, and 4. The rubber may be used in the form of sheets secured between sheets of the paper, or it may be applied in liquid form to the side or sides of the sheets of paper, as may be desired.

With this construction the heat caused by the slip of the friction-wheel will soften the rubber, spread it over the surface of the said wheels, and cause them to take a firmer hold upon the faces of the wheels I P, making the change of motion more sure and prompt.

Having thus described my invention, what I claim as new, and desire to secure by Letters Patent, is—

The combination of the two levers U X, the two arms S V, the three connecting-rods R W Y, and the U-bar Z with the sliding bearings of the lower friction-wheel, C', and with the lever G, that carries the feed friction-shaft F and the upper friction-wheel, H, substantially as herein shown and described.

JAMES HENRY WATSON.

Witnesses:
SIBLEY G. TAYLOR,
W. P. TOSSELL.